(12) United States Patent
Adragna et al.

(10) Patent No.: US 7,884,588 B2
(45) Date of Patent: Feb. 8, 2011

(54) CONTROL METHOD AND DEVICE FOR A SYSTEM OF INTERLEAVED CONVERTERS USING A DESIGNATED MASTER CONVERTER

(75) Inventors: Claudio Adragna, Monza (IT); Aldo Novelli, Parabiago (IT); Antonio Borrello, Trezzano Sul Naviglio (IT); Laszlo Huber, Cary, NC (US); Brian T. Irving, Hillsborough, NC (US); Milan M. Jovanovic, Cary, NC (US)

(73) Assignees: STMicroelectronics S.r.l., Agrate Brianza (IT); Delta Electronics, Inc., Taipei (TW)

( * ) Notice: Subject to any disclaimer, the term of this patent is extended or adjusted under 35 U.S.C. 154(b) by 433 days.

(21) Appl. No.: 12/100,958

(22) Filed: Apr. 10, 2008

(65) Prior Publication Data

US 2009/0257257 A1 Oct. 15, 2009

(51) Int. Cl.
G05F 1/59 (2006.01)
(52) U.S. Cl. ......... 323/272; 363/72
(58) Field of Classification Search ......... 323/272; 363/65, 72
See application file for complete search history.

(56) References Cited

U.S. PATENT DOCUMENTS

| | | | |
|---|---|---|---|
| 4,886,981 A * | 12/1989 | Lentini et al. | 307/87 |
| 5,793,191 A | 8/1998 | Elmore et al. | |
| 5,905,369 A | 5/1999 | Ishii et al. | |
| 6,141,231 A * | 10/2000 | Brkovic | 363/72 |
| 6,574,124 B2 * | 6/2003 | Lin et al. | 363/65 |
| 6,664,659 B1 * | 12/2003 | Adi | 307/64 |
| 7,038,923 B2 * | 5/2006 | Zhou | 363/72 |
| 7,518,894 B2 * | 4/2009 | Fosler et al. | 363/72 |
| 2003/0048648 A1 * | 3/2003 | Lin et al. | 363/65 |
| 2006/0077604 A1 | 4/2006 | Jansen | |
| 2009/0257257 A1 * | 10/2009 | Adragna et al. | 363/65 |

OTHER PUBLICATIONS

Elmore, "Input Current Ripple Cancellation in Synchronized, Parallel Connected Critically Continuous Boost Converters," Proceedings of the IEEE Applied Power Electronics Conference and Exposition (APEC), San Jose, CA, Mar. 3-7, 1996, pp. 152-158.
Ishii et al., "Power Factor Correction using Interleaving Technique for Critical Mode Switching Converters," Proceedings of the IEEE Power Electronics Specialists Conference (PESC), Japan, 1998, pp. 905-910.
Irving et al., "A Comparative Study of Soft-Switched CCM Boost Rectifiers and Interleaved Variable-Frequency DCM Boost Rectifier," Proceedings of the IEEE Applied Power Electronics Conference (APEC), Feb. 2000, 7 pages.
Zhang et al., "Evaluation of Input Current in the Critical Mode Boost PFC Converter for Distributed Power Systems," Proceedings of the IEEE Applied Power Electronics Conference(APEC), Feb. 2001, pp. 130-136.

* cited by examiner

*Primary Examiner*—Jeffrey L Sterrett
(74) *Attorney, Agent, or Firm*—Lisa K. Jorgenson; Timothy L. Boller; Seed IP Law Group PLLC

(57) ABSTRACT

Control device for a switching converter structure comprising at least a first and a second interleaved converter, wherein the control device is configured to designate one converter as master and at least the other converter as slave, to set a time delay of the operating cycle of the slave converter and to synchronize the master and the at the least one slave converter.

25 Claims, 8 Drawing Sheets

CONTROL METHOD AND DEVICE FOR A SYSTEM OF INTERLEAVED CONVERTERS USING A DESIGNATED MASTER CONVERTER

BACKGROUND

1. Technical Field

The present disclosure refers to a control device for interleaved converters, to a system of interleaved converters and a related control method.

2. Description of the Related Art

Switch-mode Power Supplies (SMPS) which operate off the public distribution power line, are known as "offline power supplies". These often comprise switch-mode converters used for the active correction of the input power factor (Power Factor Correctors, PFC). The purpose of a PFC converter is to draw from the power line a current that is essentially sinusoidal and in-phase with the line voltage.

The typical front-end stage of a traditional offline SMPS, made up of a bridge rectifier that receives the ac line voltage at its input and a smoothing/reservoir capacitor connected right across the output of the bridge, produces a non-regulated dc voltage bus with some residual ac component superimposed (ripple). This dc bus will serve as the input for a dc-dc switching converter that will provide one or more regulated output rails to supply the load. These rails are generally isolated from the power line for safety reasons.

The smoothing/reservoir capacitor has large enough capacitance so that this residual ripple is considerably smaller than the dc value, which, therefore, will be only slightly lower than the peak value of the line voltage. As a result, the voltage on the dc side of the bridge is higher than the instantaneous ac voltage applied to the input side most of the time and the bridge rectifiers then conduct only for a small portion of the line cycle. The resulting current drawn from the mains is a series of narrow pulses whose amplitude can be even 5-10 times larger than the resulting average value. To the power line, the SMPS then appears as a strongly non-linear load.

There are considerable drawbacks, as compared to the case of sinusoidal current absorption typical of linear loads: the peak and rms values of the input current will be much higher, the line voltage will be distorted because of the almost contemporary pulsed absorption from all the units connected to the power line, the current into the neutral wire in three-phase power distribution systems will be considerably increased and, on the whole, there will be a poor utilization of the power generation system's capability. In fact, the pulsed current absorbed by offline SMPSs is rich in odd harmonics that do not contribute to the active power transferred to the load and do contribute to increase the current rms value, and it is well known that the power dissipation in wires, and conductors in general, is proportional to the squared rms current.

In quantitative terms, this can be expressed in terms of Power Factor (PF), intended as the ratio of the active power entering the unit (i.e., the power transferred to the load plus that lost inside the unit and dissipated as heat) and the apparent power (the product of the input rms voltage times the input rms current), or of Total Harmonic Distortion (THD), generally intended as percentage ratio of the energy associated to the higher order harmonics to that of the fundamental harmonic. Typically, a traditional SMPS without PFC has a PF around 0.4-0.6 and a THD greater than 100%.

By using switching techniques, a PFC pre-regulator, located between the bridge rectifier and the smoothing/reservoir capacitor, thereby essentially in series to the dc-dc converter that supplies the load, allows the current drawn from the power line to be nearly sinusoidal and in-phase with the line voltage, achieving a PF close to 1 and a low THD (for example lower than 5%), thus addressing the above-mentioned issues.

A PFC pre-regulator is a switch-mode converter controlled in such a way that it generates a regulated dc output bus starting from a rectified ac voltage. In principle, any switching topology (mutual configuration of the main parts constituting the converter) is able to achieve a high PF and a low THD but, in practice, the so-called boost topology, is generally the most advantageous and, then, the most used one.

The boost converter generates an output voltage higher than the input voltage (that is why it is sometimes called "step-up" converter); then, when used in a PFC pre-regulator, it generates an output voltage higher than the maximum line peak voltage, typically set at 400V in systems supplied by the European power line or required to operate world-wide.

There are two major control methodologies, both based on the concept of pulse-width modulation (PWM) currently in use in PFC pre-regulators: the first one, used when the boost converter is operated at fixed frequency with continuous conduction mode (CCM) current of the boost inductor, forces the average boost inductor's current to follow a sinusoidal reference; the second one, used when the boost inductor is operated close to the boundary between CCM and DCM (discontinuous conduction mode), sometimes termed TM (transition mode) operation, forces the envelope of the peak inductor current to follow a sinusoidal reference.

As compared to CCM operation, with the same power level TM operation implies higher peak and rms values for the circulating currents but, on the other hand, it offers soft-switching (i.e., less power loss due to switching) of both the boost diode and the switch without extra components; additionally, the associated control methodology, as well as the practical realization, is simpler. However, the factor that really sets CCM operation apart from TM operation and determines which approach to choose in a given application is the inductor ripple current. To facilitate electromagnetic compatibility (EMC), the high-frequency electrical noise generated by any SMPS and injected back into the power line is kept at a low level. The emission limits are set by relevant EMC regulations and, to comply with them, an LC filter is placed between the input terminals of the SMPS and the bridge rectifier. The high-frequency differential-mode noise that this filter attenuates and keeps below the limits is proportional to the amplitude of the inductor current ripple. For reasons that will be clarified at the end of this section, in a typical TM-operated PFC the amplitude of the current ripple is twice the amplitude of the sinusoidal current drawn from the power line. In a CCM-operated PFC, this ripple will typically be 20-40% of the line current; for the same power level, this means a current ripple 5-10 times smaller. Obviously, the burden for the line filter is enormously alleviated.

This is why TM operation is generally preferred at medium-low power level (typically, <200 W) since the benefits of simplicity and soft-switching often outweigh the demerits of higher RMS currents and greater filtration, while CCM operation is generally suitable to handle higher power levels.

A known PFC pre-regulator in boost topology is shown in FIG. 1.

The boost converter comprises a bridge rectifier 100 having the ac power line at its input (Vin is its rms value); a capacitor Cin, which serves as a high-frequency smoothing filter, connected across the output terminals of a bridge 100, with the negative terminal connected to ground; an inductor L with one end connected to the positive terminal of Cin and including an auxiliary winding; a power switch (typically a MOSFET) M having the drain terminal tied to the other end of the inductor L, the source terminal to ground via a resistor Rs that allows sensing the current flowing through M (i.e., the current flowing through L when M is ON) as a positive voltage drop across Rs itself; a diode D having the anode tied to the node common to L and MOSFET's drain and the cathode connected to the positive plate of the capacitor Co that has its negative plate connected to ground GND. This boost converter generates at its output terminals across Co a dc voltage Vo that will supply the load, typically represented by a dc-dc converter or, in other cases, electronic lamp ballast or a motor.

A control device 10 of the converter comprises an error amplifier VA comparing a portion of the output voltage Vo, brought at its inverting input externally available on pin P1 via the resistor divider R3-R4, with an accurate internal reference Vref connected to the non-inverting input, and generates an error signal proportional to their difference. If the bandwidth of the error amplifier, essentially determined by the frequency compensation network connected between the inverting input and the output (pin P2), is narrow enough—typically below 20 Hz—and a steady-state operation is assumed, the error signal available at pin P2 can be regarded as a dc level, at least as a first approximation.

The error signal is internally fed into one input of the multiplier block 102, which, at the other input, receives a portion of the instantaneous rectified line voltage sensed after the bridge rectifier and brought to pin P3 through the resistor divider R1-R2. The output of the multiplier block will be the product of a rectified sinusoid times a dc level, then still a rectified sinusoid whose amplitude depends on the rms input voltage and the amplitude of the error signal; this will be the reference for PWM modulation.

In fact, the output signal of the multiplier block 102 is fed to the inverting input of a PWM comparator 103 that receives at its non-inverting input the voltage sensed across the sense resistor Rs, which is a voltage proportional to the instantaneous current flowing through the inductor L and the power switch M when this is ON. Assuming M is initially ON, the current through L will be ramping up and so will do the voltage across Rs; when the two input voltages of the comparator are equal, the PWM comparator will reset the SR flip-flop FF and the MOSFET M will be switched off. Therefore, the multiplier output, shaped as a rectified sinusoid, determines the peak value of the inductor and MOSFET currents that, as a result, will be enveloped by a rectified sinusoid.

After the MOSFET M has been switched off the inductor L dumps its energy into the output capacitor Co and the load until it is completely demagnetized. At this point, the diode D opens and the drain node becomes floating; its voltage would tend to eventually reach the instantaneous line voltage through a damped ringing due to its parasitic capacitance that starts resonating with the inductance of L. However, the quick drain voltage fall that follows boost inductor's demagnetization is coupled to pin P5 of the control device through the auxiliary winding in L. The Zero-current Detector (ZCD) block 104 releases a pulse every time there is a negative-going edge on pin P5 and this pulse sets the flip-flop FF and drives the MOSFET ON, hence starting a new switching cycle.

In this way the control drives the beginning of every switching cycle after boost inductor's current has decreased to zero, with a small delay. Because of this delay, often negligible as compared to inductor charging and discharging intervals, the converter will not operate exactly at the DCM/CCM boundary, or in TM, but slightly in DCM; what's more, if the delay is properly chosen, MOSFET's turn-on can be driven when the drain voltage ringing has a valley and, therefore, it is minimized. This condition is termed "valley switching". It is worth noticing that, if this first pulse generated by the ZCD (Zero Current Detection) block 104 should not switch the MOSFET on for any reason, the drain voltage would keep on ringing; there would be a second oscillation and a second negative-going edge, which would generate a second pulse able to switch on M, and so on, until the oscillation damps to so small values that they can no longer trigger the ZCD block.

In other words, with this kind of operation the converter's switching frequency is "self-synchronized" to boost inductor demagnetization; its value is determined by the time needed to charge and discharge the inductor L and, then, depends on the value of L itself too. Since it is much higher than the line frequency it is possible to express the switching frequency as a function of the instantaneous phase angle θ of the line voltage; neglecting turn-on delay after demagnetization, the relationship is:

$$f_{sw} = \frac{1}{2L}\frac{Vin}{Iin}\left(1 - \frac{\sqrt{2}\,Vin}{Vout}\sin\theta\right),$$

where Iin is the rms value of the current drawn from the power line. This is an important point for all the considerations that will follow.

In principle, then, a clock/oscillator is not needed to let the converter work. At system's power-up, however, when no signal is available at pin P5, something that initiates the first switching cycle and the subsequent ones is needed, until the signal applied to the ZCD block 104 has an amplitude large enough to be detected by the internal circuits. This is the purpose of the starter block 105, which is disabled once the system gets self-synchronized.

The typical inductor current waveform along a line voltage half-cycle is made up of a series of contiguous (if turn-on delay after demagnetization is neglected) triangles whose height is enveloped by a rectified sinusoid. For apparent geometric reasons, the average inductor current, that is, the cycle-by-cycle average value of the inductor current, will be half the peaks envelope and, then, it will be sinusoidal too. On the other way round, this explains why the inductor current ripple, which here coincides with the total inductor current, is twice the low-frequency line current.

The current drawn from the power line will be the low-frequency component of the inductor current; the switching frequency component, in fact, is almost totally eliminated by the input used for compliance with EMC regulations.

As above mentioned, the TM approach to PFC generally is preferred at lower power levels because of its simpler realization, lower cost and, above all, because of the filtering requirements that make its use impractical at power levels exceeding few hundred watts. It must be said, however, that TM approach has other favorable characteristics.

In a CCM-operated PFC, the transistor M is turned on—and the voltage across D is reversed—before the inductor demagnetizes, that is, while the boost diode D is still conducting current. This produces large current recovery spikes in the boost diode and in the MOSFET, where they cause considerable additional power dissipation; in addition they increase the level of high-frequency electrical common-mode noise generated that needs to be filtered out by the line filter. These issues are completely absent in TM-operated PFC systems, where the MOSFET M is switched on (and the voltage across the boost diode D is reversed) only after the inductor is demagnetized, i.e., when the boost diode current is zero.

In a CCM-operated PFC, when the MOSFET M is turned on, the drain voltage equals the output voltage Vo, and then the power loss associated to the discharge of the drain capacitance inside the MOSFET itself is considerable. Such is also the level of the common-mode electrical noise generated and that is filtered out. In a TM-operated PFC the voltage drain at MOSFET's turn-on is always lower than Vo, even zero under some conditions, and then the associated power loss, as well as the level of common-mode noise, is considerably lower.

In the hundred watts power range, where the worse current form factor of TM operation is not that big a penalty (the rms currents with TM are only 15% larger than with CCM), the efficiency of a TM-operated PFC may be higher than that of a comparable one CCM-operated. On the other hand, in some noise-sensitive applications where PFC is normally used, such as TV or audio equipment, the noise associated to boost diode's reverse recovery and/or drain capacitance discharge may rise serious problems of electromagnetic compatibility inside the piece of equipment itself and make the use of a CCM-operated PFC troublesome.

However, there are practical limits imposed by its heavy filtering requirements, as far as differential-mode noise is concerned.

BRIEF SUMMARY

In view of the state of the art, an embodiment of the present invention provides a control device for a converter structure that overcomes the above mentioned disadvantages.

According to an embodiment a control device for a switching converter structure comprises at least a first and a second interleaved converter, wherein the control device comprises first means adapted to designate one between the first and the second converter as master and at least the other converter as slave, second means adapted to set a time delay of the operating cycle of the slave converter and third means adapted to synchronize the master and the at the least one slave converter.

In one embodiment, said first means are adapted to detect the one between the first and the second converter which operates at the lower frequency during at least one cycle of switching and to designate it as master and the at least another converter as slave. In one embodiment, said first means is adapted to measure the switching cycle of the master converter. In one embodiment, said second means are adapted to set a time delay for the slave converter, which is given by a part of the measured master switching cycle, after the beginning of a switching cycle of the master converter which is successive to the designation as master. In one embodiment, said converter structure comprises a plurality of n converters, wherein n is an integer number, said second means being adapted to set a time delay for the slave converters shifting them one after the other by a time equal to 1/n of the master switching cycle after the beginning of a switching cycle of the master converter which is successive to the designation as master. In one embodiment, each one of said first and second interleaved converters comprises an inductance, the operating frequency of the converters depending on the demagnetization of the inductance. In one embodiment, said second means are adapted to set a prefixed time delay of the operating cycle of the slave converter after the beginning of a switching cycle of the master converter which is successive to the designation as master. In one embodiment, each one of said first and second interleaved converters comprises a power switch, said second means being adapted to set a prefixed time delay of the operating cycle after the converter at lower operating frequency has been turned off after the designation as master. In one embodiment, said control device comprises means adapted to compares said prefixed time delay with the measured switching cycle of the master converter, said comparing means being adapted to block the operation of the second means until the next switching time of the master converter if said measured switching cycle is longer than said prefixed time delay. In one embodiment, the third means comprise further means adapted to detect if the delay time set by the second means is elapsed, said further means blocking the operation of the third means until the next switching time of the slave converter if the delay time is not elapsed. In one embodiment, the control device comprises means adapted to turn off the first means in the case of missing line cycle and means adapted to turn on said first means. In one embodiment, the control device comprises means adapted to send a time-out signal when the first and a second interleaved converter operate at frequencies so close to one another such that the detection means are not able to distinguish the converter which operates at lower frequency. In one embodiment, the control device operates in transition mode. In one embodiment, at least a first and a second interleaved converter comprising a power transistor and an inductance, said first means receiving the drive signals of the transistors and the signal of zero cross detection of the current in the inductances for starting the designation operation when the converters are self-synchronized, said first means outputting a designation signal representative of the designation as master and as slave of the converters, the second means receiving the designation signal from the first means and the drive signals of the transistors and outputting a delay signal to the third means. In one embodiment, said converter structure is a pre-regulator for a power factor corrector.

In one embodiment, a method for controlling a converter structure comprising at least a first and a second interleaved converter, comprises the designation of one between the first and the second converter as master and at least the other converter as slave, the setting a time delay of operating cycle of at least one slave converter and the synchronization of the master and at the least one slave converter, the repetition of the preceding phases for each operating cycle. In one embodiment, the designation phase comprises the detection the one between the first and the second converter which operates at the lower frequency and the designation of the one converter as master and the at least the other converter as slave. In one embodiment, the designation phase comprises the measurement of the switching cycle of the master converter. In one embodiment, the time delay for the slave converter is given by a part of the master switching cycle after the beginning of a switching cycle of the master converter which is successive to the designation as master. In one embodiment, said converter structure comprise a plurality of n converters, wherein n is an integer number, the time delay for the slave converters being set shifting them one after the other by a time equal to 1/n of the master switching cycle after the beginning of a switching cycle of the master converter which is successive to the designation as master. In one embodiment, each one of said first and second interleaved converters comprises an inductance, the operating frequency of the converters depending on the demagnetization of the inductance. In one embodiment, the method comprises after the designation phase to set a threshold time delay of the operating cycle of the slave converter after the beginning of a switching cycle of the master converter which is successive to the designation as master. In one embodiment, second means are adapted to set a threshold time delay after the converter at lower operating frequency has been turned off after the designation as master. In one embodiment, after the setting of the threshold time delay, the phase to compare said threshold time delay with the measured switching cycle of the master converter and the blocking of the operation of the second means until the next switching time of the master converter if said measured switching cycle is longer than said threshold time delay. In one embodiment, the method comprises a phase to detect if the delay time is elapsed and, if the delay time is not elapsed, a phase of blocking the operation until the next switching time of the slave converter. In one embodiment, the method comprises a phase to send a time-out signal when the first and a second interleaved converter operate at frequencies so close to one another such that in the detection phase it is not possible to distinguish the converter which operates at lower frequency.

In one embodiment, a controller comprises: an interface to couple the controller to a plurality of interleaved converters; a designating module configured to selectively designate one of the plurality of converters as a master converter; a locking module configured to generate signals to control undesignated converters in the plurality of converters; and a synchronizing module configured to synchronize the converters in the plurality of converters. In one embodiment, the designating module is configured to detect a power converter in the plurality of power converters having a lowest operating frequency and to designate the detected converter as the master converter. In one embodiment, the locking module is configured to set delay periods for unselected converters in the plurality of converters. In one embodiment, the designating module is configured to measure a switching cycle of the master converter. In one embodiment, the delay periods are portions of the measured switching cycle of the master converter and commence after a beginning of a successive switching cycle of the master converter. In one embodiment, the plurality of converters comprises a number of converters and the locking module is configured to set respective delay periods for the non-designated converters that are successive multiples of the measured switching cycle divided by the number of converters in the plurality of converters. In one embodiment, the locking module is configured to set delay periods after designation of the master converter, the delay periods have a threshold duration and the delays commence after a beginning of a successive switching cycle of the master converter. In one embodiment, the controller further comprises a blocking module configured to selectively delay a switching cycle of a non-designated converter. In one embodiment, the blocking module is configured to compare a measured switching cycle to a threshold and to selectively delay switching of the non-designated converter based on the comparison. In one embodiment, the controller further comprises a resetting module configured to generate a reset signal in response to a missing line cycle. In one embodiment, the designating module is configured to respond to a time-out signal by selecting a default master converter. In one embodiment, the controller is configured to generate control signals to operate the plurality of converters in a valley-switching mode.

DETAILED DESCRIPTION

To facilitate the use of TM PFC beyond the practical limits imposed by heavy filtering requirements it is possible to use multi-phase, or interleaved, converters. Note that the concept of interleaving converters is different from that of paralleling converters. Paralleled converters have in common the input and the output terminals but each of them is a complete, independent unit: separated input front-ends, separated controls, separated output sections; in addition, each converter may have even a different topology. In interleaved converters there is one input front-end, one control and one output section that are shared among all of the individual converters, or stages, which, in addition, have the same topology. Then, when considered all together they form a single entity capable of operating as a stand-alone unit.

If controlled with appropriate methodologies, such as properly displacing the phase of the PWM signals controlling each stage, an interleaved converter may have new properties, not possessed by a conventional not-interleaved one. Most noticeable is the ability to minimize the combined input or the output current ripple due to the superposition of the currents of each stage, thus reducing the cost of the section concerned with the optimization. Probably the most known example of such a system is the multi-phase buck regulator used to power microprocessors on PC motherboards.

This interleaving or multi-phase approach is applicable to PFC pre-regulators as well, with the intention of minimizing the input current ripple and, therefore, filtering requirements. TM-operated PFC pre-regulators can maximally benefit from that: they generate low common-mode noise and their major penalty, a high differential-mode noise that prevents from extending their use at higher power levels, can be removed.

Figure 1:
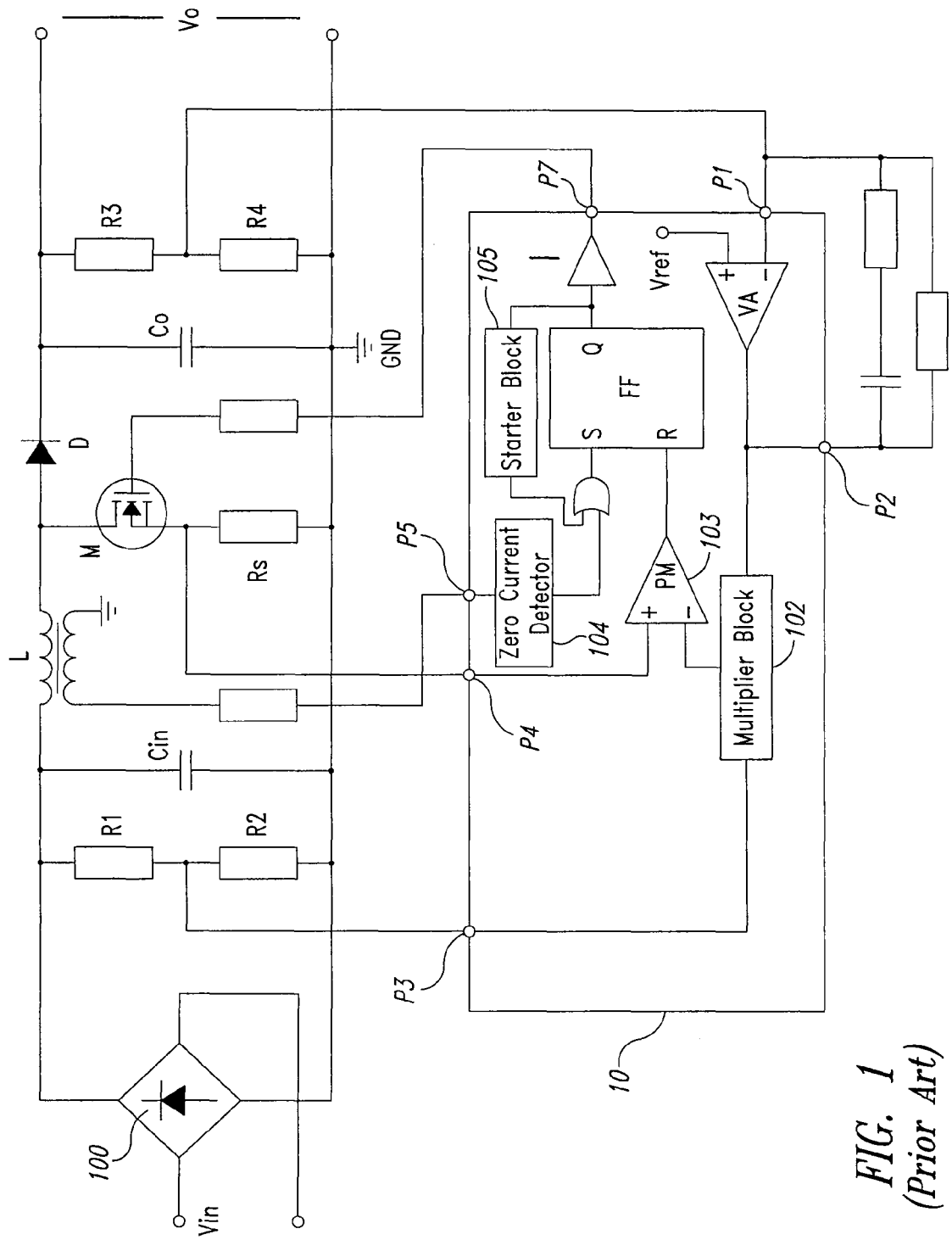
FIG. 1 shows a TM-operated PFC pre-regulator according to prior art.
Figure 2:
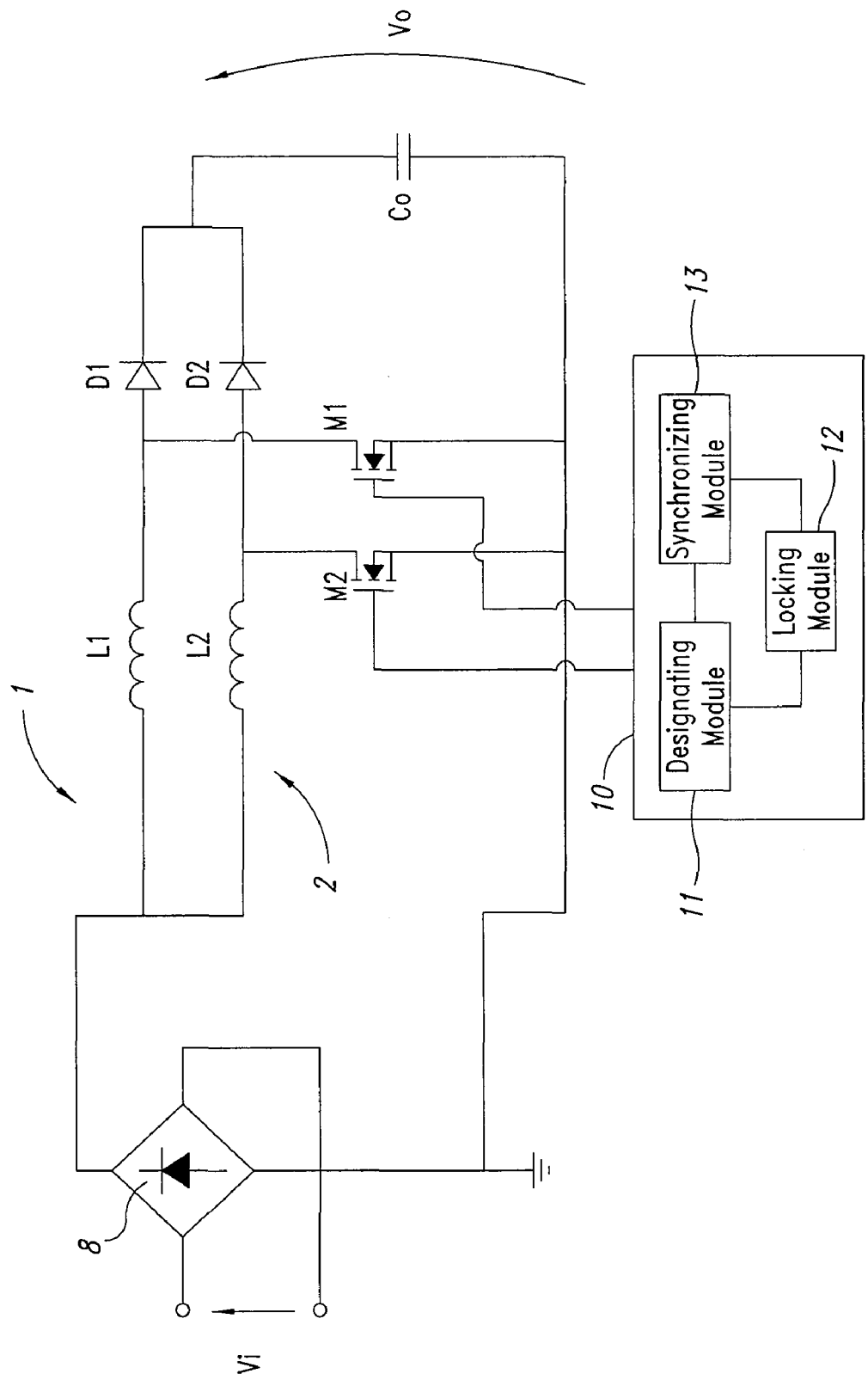
FIG. 2 shows a converter structure with a control device according to an embodiment of the invention.

Equally displacing in time the PWM pulse trains that drive the power switch of each stage will minimize the input current ripple. This is illustrated in FIG. 2, which shows a principle schematic of an interleaved 2-phase boost converter that can be used as a PFC pre-regulator, along with the individual inductor currents and the combined inductor current.

However, there is a basic difficulty with TM-operated systems: in the previous section, it has been shown that they are "self-synchronized" and not clocked by an oscillator, so that the switching frequency of each stage depends on the inductance value of their respective boost inductor. This value, because of production tolerances, has a statistical spread that may reach ±10%. As a consequence, although using nominally identical inductors, the inductance value in the n stages may not be the same and they will naturally work at different frequencies even though all the other parameters are exactly the same.

The inductance value is the most important parameter in determining the operating frequency, but is not the only one: another contributor is the parasitic capacitance of the drain nodes, essentially due to the combination of MOSFETs' output capacitance, to boost inductor winding capacitance and to boost diode junction capacitance. This capacitance, along with L, determines the drain ringing frequency and, then, the delay from TM to valley switching. Other sources of mismatch are the sense resistors Rs of the n stages, which are nominally the same but may have ±1% tolerance, and those related to the control circuit, such as propagation delays, comparator offsets, and threshold tolerances.

As a result of these mismatches, the n stages will be unsynchronized and the resulting high frequency input current ripple will be amplitude-modulated from the theoretical minimum value (which may be even zero) up to n times the input current of each stage. Therefore, a control system that handles interleaving is needed. In one embodiment, it will control the n stages to work at the same frequency, so that they can be correctly locked in phase (360°/n), and will prevent a stage from operating in CCM, so as to prevent all the related problems.

Interleaving techniques for asynchronous systems like a set of TM-operated boost stages can be classified in two big groups: open-loop and closed-loop techniques. In both cases, a master-slave approach is used, wherein one of the n stages (the master) keeps the pace and the others (the slave ones) are synchronized to the master. In the open-loop techniques, the slave can be synchronized either to the turn-on instant of the master or to the turn-off instant of the master. In the closed-loop techniques, the slave converter is synchronized to the master converter by using a phase-looked loop (PLL) approach and adjusting the turn-off instant of the slave converter.

In the ideal case of perfectly matching individual converters (same value of L for all), they would naturally work at the same frequency and with valley switching, i.e., slightly in DCM as previously specified; in reality, this does not happen and, once the slave stages are forced to work at the same frequency of the master that, by definition, works in TM (valley switching), all of them must work deeper in DCM: it is understood, therefore, that the role of the master is taken by the stage that naturally runs at a lower frequency.

In the open-loop techniques the roles of the master and slave are preset. For instance, the roles of the master and slave can be preset by an intentional unbalance of the respective current loop gains, or by using different inductor values.

The master stage is TM-operated, exactly as if it were stand-alone; to synchronize the slave stage there is a system that measures the master stage's switching period in the k-th cycle and uses this information to initiate the (k+1)-th cycle of the slave stage exactly after half of the measured time, so as to achieve 180° phase shift. This is acceptable because the length of the switching period does not change significantly from one cycle to the next one, given the large difference between line and switching frequencies.

The good point of this technique is that it is simple and robust; it can be integrated with little effort in a control IC and, being open-loop, does not need frequency compensation, which might require external adjustment and then a dedicated pin of the IC, which the adjustment components should be connected to.

The issue in this technique is that all of the slave stages should work in DCM. To do so under worst case conditions, considering the tolerance of the involved parameters (firstly, the inductance value L) in mass production, in typical conditions the slave stages will work more in DCM and then, will carry a considerably lower fraction of the total load, as compared to the master stage. Furthermore, considering a worst-case scenario in the opposite direction, the slave stages will work deep in DCM and will likely carry a fraction of the total load that is much lower than that handled by the master stage. This leads to unevenly distributed thermal stress, which hurts system reliability in the long run if not properly accounted for at design time. On the other hand, designing each stage for a power much higher than the nominal one is all but cost-effective; current loop gain unbalance is not desirable The other possible option, i.e., using different inductor values, leads to the same load unbalance issues and is quite impractical from the manufacturing standpoint, for a number of easily understandable reasons. In the end, both options are practically unacceptable and this partly explains why the interleaving technique, in spite of being so promising, has found little success in industry.

It is, therefore, desirable to improve the open-loop technique, providing a methodology that allows interleaving to be performed on two or more nominally identical stages without requiring any adjustment components and that is able to keep load sharing unbalance to a minimum. Additionally, it is desirable to provide a circuit that realizes the above mentioned methodology and that can be easily integrated inside a silicon chip.

As previously said, the biggest issue in the open-loop master-slave approach where the roles of master stage and slave stages are pre-defined is that each stage needs to be considerably oversized to make sure that all of the slave stages will work in DCM. The fundamental issue is just that the master/slave roles are pre-defined: if one could know beforehand which stage is the slowest, then this could be designated as the master and no unbalance would be needed. In that case the load sharing unbalance might be kept as close to the theoretical minimum value (two times the tolerance of L) as possible. For example, for two interleaved converters, the worst-case current sharing error can be determined as $$\frac{\Delta i_L}{i_{Lave}} = 2 \cdot \frac{1-\alpha^3}{1+\alpha^3},$$

when the master/slave roles are pre-defined, and as $$\frac{\Delta i_L}{i_{Lave}} = 2 \cdot \frac{1-\alpha}{1+\alpha}$$

when the master/slave roles are pre-detected; in the above relation, α is defined as the ratio of the two boost inductances, $\Delta i_L$ is the variation of the current iL and $i_{Lave}$ is the average of the current iL. If the tolerance of the boost inductances is ±5%, the current sharing error for the pre-defined and pre-detected master/slave converters is 30% and 10%, respectively, whereas, if the tolerance of the boost inductances is ±10%, the current sharing error for the pre-defined and pre-detected master/slave converters increases to 58% and 20%, respectively.

An embodiment provides a method where the master/slave roles are not pre-defined but detected, i.e., assigned by an automatic designation system, so that there is no need for unbalance and the resulting load sharing depends on inductance mismatch.

An embodiment of a proposed circuit is described in FIG. 2 and an embodiment of a proposed method in its basic formulation can be described as follows.

Initially, all the n stages (with n>1) are started up and each of them works independently, self-synchronized to the demagnetization of their respective boost inductor; in other words, each at their own natural operating TM frequency.

During this initial phase, which stage is working at the lowest frequency is detected, possibly on the basis of a number of cycles, so as to avoid wrong decisions in case of small differences between two or more stages.

The stage detected as working at the lowest frequency is designated as the "master" stage. In case the switching frequencies of the n stages are so close to one another that the system is not able to discriminate which the lowest is after a preset time period, a default or predefined stage may be designated as the master stage. Once designated, the master stage will keep on working self-synchronized to its own boost inductor's demagnetization and its switching period TSW_M will be measured cycle by cycle.

Subsequently, starting from the master stage's switching cycle subsequent to designation/measurement, the other slave stages will be locked (more precisely, the turn-on of their respective power switch) to the master stage (more precisely, to the turn-on of its power switch), shifting them one after the other by a time equal to 1/n of the TSW_M measured in the previous cycle. That is, assuming the beginning of the (k+1)-th switching cycle of the master stage as t=0, the (k+1)-th switching cycle of the j-th slave stage (j=1, ..., n−1) will be initiated at the time tj=TSW_M_k·j/n, where TSW_M_k is the duration of k-th switching cycle of the master stage. The actual sequence of the slave stages is unimportant, it can be pre-defined.

The circuit in FIG. 2 comprises a converter structure comprising at least two interleaved converters 1 and 2 with, respectively, inductances L1, L2 connected with diodes D1, D2; the inductances L1 and L2 are both coupled to an input voltage V1 rectified by a diode bridge 8 and the diodes D1, D2 are connected together with a capacitor Co, connected to ground GND, across which the output voltage Vo of the converter structure is detected. Between the anodes of the diode D1 and D2 and ground the MOS transistor M1, M2 are arranged and they are driven by a control circuit or block 10 comprising a circuit or block 11 adapted to detect which stage is working at the lowest frequency and to designate this stage as master and the other stage as slave, a circuit or block 12 adapted to the lock the slave stage (more precisely: the turn-on of their respective power switch) to the master stage (more precisely: to the turn-on of its power switch), shifting it by a time equal to ½ of the period TSW_M measured in the previous cycle and a circuit or block 13 adapted to synchronize the master and slave stages. In the case of the converter structure comprises n stages the circuit 12 is adapted to lock each slave stage to the master stage shifting them one after the other by a time equal to 1/n of the TSW_M measured in the previous cycle.

As previously specified, while the master stage works with "valley switching" (i.e., its power switch is turned on at the moment when the voltage across its terminals is minimum, after boost inductor demagnetization, hence minimizing the associated capacitive loss), the slave stages, being naturally faster, will work more in DCM. Consequently, the voltage across the terminals of their power switches has reached the valley in advance and is still ringing; hence, the value at turn-on can range from zero to that of the output voltage, depending on the switching period mismatch (which, in turns, depends on the inductance mismatch). The associated capacitive loss can be considerable and impair conversion efficiency significantly, especially at intermediate and light loads.

To avoid this, an optional change to the above described methodology can be employed in an embodiment. The idea is to delay power switch turn-on of the j-th slave stage after the instant TSW_M_k·j/n envisaged by the previous formulation of the methodology, until the voltage across its terminal, which is still ringing, is again minimized. This allows "valley switching" operation for the slave stage as well, thus minimizing capacitive loss and its adverse impact on efficiency, but at the expense of a slight increase of the input current ripple due to the phase shift between the individual input currents that is no longer optimized.

It is typical of TM-operated PFC stages to run at quite high switching frequency, especially at medium-light load, when magnetization and demagnetization times become very short because the instantaneous peak inductor current is small. This does not go in favor of efficiency, and, for this reason, it is sometimes desired to limit switching frequency somehow.

It is possible to add another option to an embodiment of the methodology, which can be used as an alternative to or in conjunction with the first option. It is possible to enable the turn-on of the power switch in the (k+1)-th cycle for the master stage after a threshold time period Tmin, which can be programmable by the user, has elapsed after the beginning of the k-th cycle, or after the power switch has been turned off in the k-th cycle. Although both options meet the goal of limiting the maximum operating frequency, the first one is preferable because it defines directly the limiting value.

Then, if TSW_M_k>Tmin, the master transformer demagnetization sensing will initiate the (k+1)-th cycle; otherwise, if TSW_M_k<Tmin, the system will wait for the next demagnetization ringing of the master inductor to initiate the (k+1)-th cycle. As to the j-th slave stage, if the delay of tj=TSW_M_k·j/n at the beginning of the (k+1)-th cycle of the master stage has elapsed, the next demagnetization ringing of the j-th slave stage will initiate the cycle. The circuit 12 of the block 10 (FIGS. 3 and 4) may be configured to perform the above mentioned operations.

Figure 3:
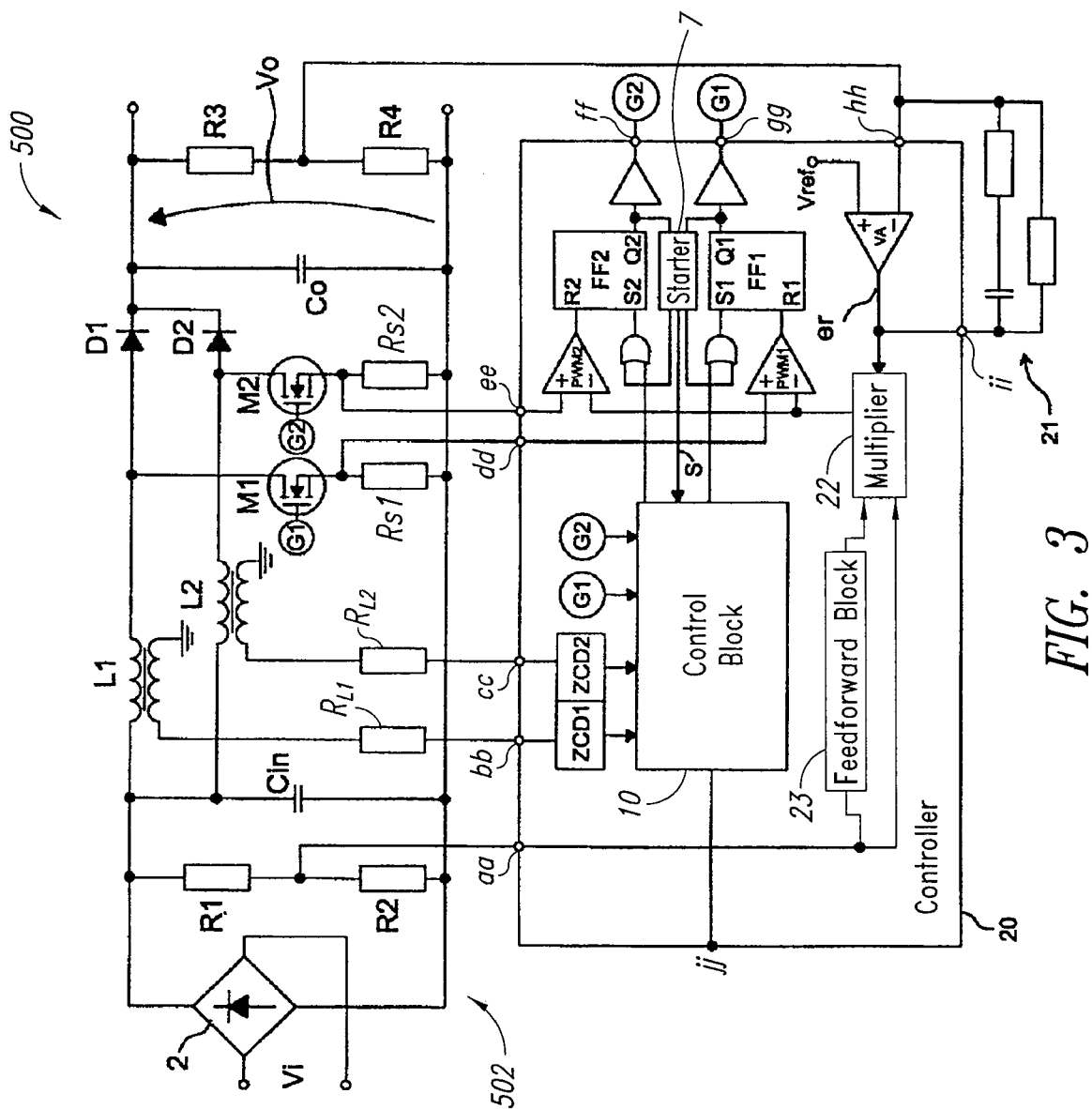
FIG. 3 shows an embodiment of a controller for a PFC pre-regulator suitable for use, for example, with the converter structure of FIG. 2.

In FIG. 3 it is shown an embodiment of a system 500 comprising a converter structure 502, which as illustrated is a PFC pre-regulator composed of two interleaved TM-operated boost stages. One skilled in the art could extend this concept to a set of n (with n>2) interleaved stages, and to topologies other than boost (such as buck, buck-boost, flyback, forward, Cuk, Sepic, etc), after reviewing the specification.

The PFC pre-regulator includes a bridge rectifier 2 having the ac power line Vi at its input, a capacitor Cin, which serves as a high-frequency smoothing filter, connected across the output terminals of the bridge, with the negative one connected to ground and a pair of boost converters generating at the output terminals across a capacitor Co a dc voltage Vo that will supply a load. The pair of boost converter comprises two inductors L1, L2 both having one end connected to the positive terminal of Cin and preferentially including an auxiliary winding, two power switches M1, M2 having the drain terminals tied to the other end of the inductors L1 and L2 respectively, the source terminals to ground GND via the sense resistors Rs1, Rs2 respectively, which allow reading the current flowing through M1 and M2 as a positive voltage drop across Rs1 and Rs2 respectively, two diodes D1, D2, with the anode of D1 tied to the node common to L1 and the drain of M1, the anode of D2 tied to the node common to L2 and the drain of M2, and both cathodes connected together and to the positive plate of the capacitor Co that has the negative plate connected to ground GND. Their steady-state operation with the master and slave roles already identified will be now briefly described.

The controller 20, which may take the form of an integrated circuit having pins or terminals, comprises an error amplifier VA comparing a portion of the output voltage Vo, brought at its inverting input externally available at terminal hh via the resistor divider R3-R4, with an accurate internal reference Vref connected to the non-inverting input and generates an error signal proportional to their difference. If the bandwidth of the error amplifier, essentially determined by the frequency compensation network 21 connected between the inverting input and the output terminal ii of the error amplifier VA, is narrow enough—typically below 20 Hz—and a steady-state operation is assumed, the error signal available at the terminal ii can be regarded as a dc level, at least as a first approximation.

The error signal er is internally fed into one input of the multiplier block 22, which, at the other input, receives a portion of the instantaneous rectified line voltage sensed after the bridge rectifier 2 and brought to terminal aa through the resistor divider R1-R2. Optionally, the multiplier 22 has an additional input coming from the "Voltage feedforward" block 23, which provides a dc level related to the rms value of the rectified input voltage in such a way that the overall gain is independent of the input voltage. The output of the multiplier block will be the product of a rectified sinusoid times a dc level, then still a rectified sinusoid, whose amplitude depends on the rms input voltage and the amplitude of the error signal (and on the feedforward signal, in case it is present); this will be the reference for PWM modulation for both boost stages.

In fact, this signal is fed to the inverting inputs of the comparators PWM1 and PWM2, which receive the voltages sensed across the sense resistors Rs1 and Rs2 respectively on their non-inverting inputs; the voltage across Rs1 is proportional to the instantaneous current flowing through the inductor L1 when M1 is ON, the voltage across Rs2 is proportional to the instantaneous current flowing through the inductor L2 when M2 is ON.

Assuming, for example, that the transistor M1 is initially ON, the current through L1 will be ramping up and so will do the voltage across Rs1; when the voltage at the non-inverting input of the PWM comparator increases to the reference level, the PWM comparator PWM1 will reset the SR flip-flop FF1 and the MOS transistor M1 will be switched off. Then, the multiplier output determines the same peak value for the current of both inductors that, as a result, will be both enveloped by a rectified sinusoid.

After the MOSFET M1 has been switched off the inductor L1 dumps its energy into the output capacitor Co and the load until it is completely demagnetized. At this point, the diode D1 opens and the drain node of M1 becomes floating; its voltage would tend to eventually reach the instantaneous line voltage through a damped ringing due to its parasitic capacitance that starts resonating with the inductance of L1. However, the quick drain voltage fall that follows either boost inductor's demagnetization is coupled to terminals bb and cc of two ZCD blocks ZCD1 and ZCD2 through the auxiliary windings in L1 and L2 and optional resistors RL1 and RL2, respectively. The blocks ZCD1 and ZCD2 release a pulse every time there is a negative-going voltage edge at their input.

In the master stage this pulse, after an appropriate delay, sets the SR flip-flip FF1 or FF2 and drives the respective MOSFET ON, hence starting a new switching cycle and making the stage work with valley switching.

In the slave stage, MOSFET's turn-on is not directly determined by this signal but by the control block 10.

The block 10, by means of the circuit 12 (see FIG. 4), will switch slave stage's MOSFET on when half of the master stage's switching period TSW_M (measured in the previous cycle) has elapsed after master stage's MOSFET turn-on. Alternatively, the same block 10 can, by means of the circuit 12, switch slave stage's MOSFET on as the circuit ZCD1 or ZCD2 detects the first negative-going edge of the drain ringing following the instant when a time TSW_M/2 (measured in the previous cycle) has elapsed after master stage's MOSFET turn-on.

Even alternatively, the master stage's MOSFET, may not be turned on by the first negative-going edge of the drain voltage ringing following its inductor's demagnetization if a minimum time Tmin has not elapsed after the beginning of the previous cycle. This minimum time can be programmed by an external passive part (resistor or capacitor) connected to terminal jj. This will limit the switching frequency of the master stage and, consequently also that of the slave stage, since its MOSFET's turn-on is locked to half the period of the master stage. In this case, master stage's MOSFET turn-on will be triggered by the first negative-going edge of the drain ringing following the time Tmin after the beginning of the previous cycle.

Note that these optional operating modes take advantage of a pulse release by the ZCD1 or ZCD2 blocks at a negative-going edge coupled to their input: if the first pulse, that released just after inductor's L1 or L2 demagnetization, does not switch M1 or M2 on, the drain voltage will keep on ringing, there will be a second oscillation, a second negative-going edge and another pulse will be released, and so on.

As previously stated, this is a high-level description of circuit's operation once the master/slave designation as been done; however to understand how the designation can be done and to have more insight on how the interleaving circuit operates, the description proceeds to a lower level.

Figure 4:
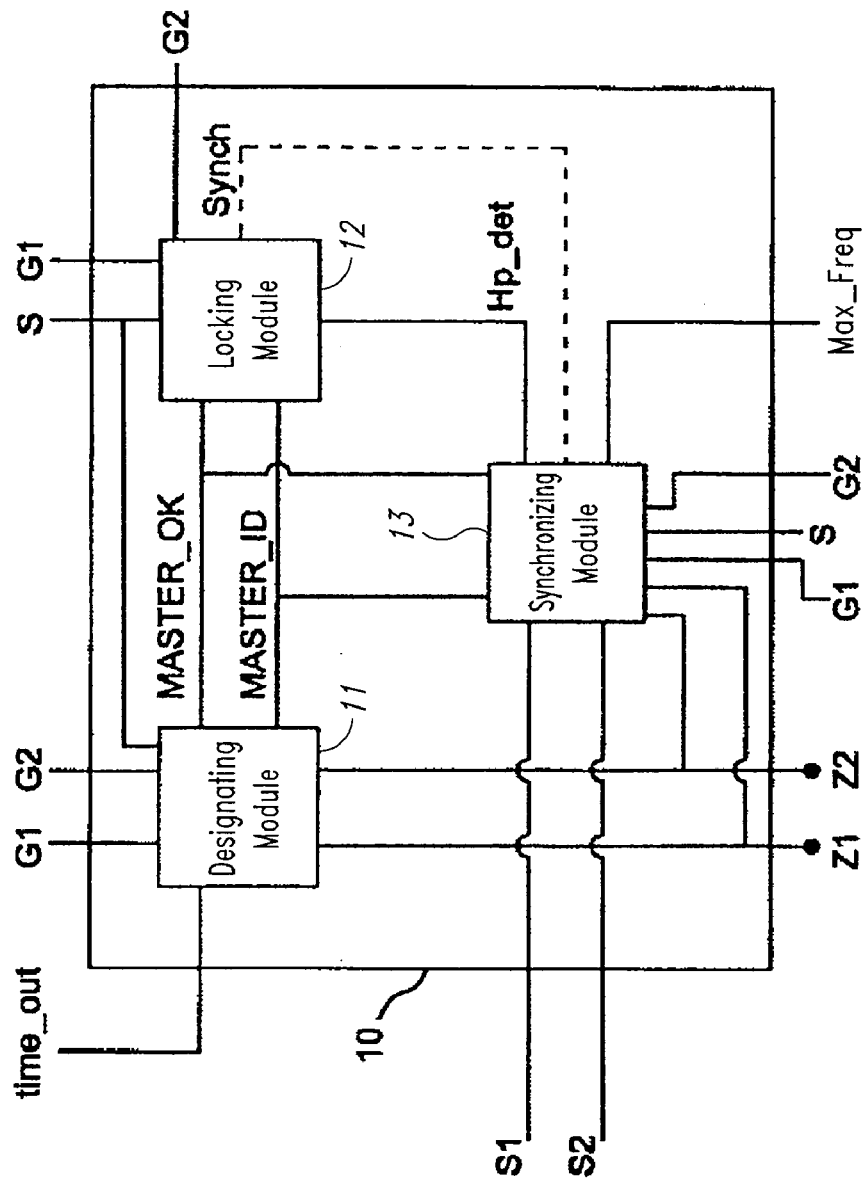
FIG. 4 shows in more detail an embodiment of the control block 10 suitable for use, for example, in the controller shown in FIG. 3.

FIG. 4 shows, in more detail, the internal block diagram of an embodiment of the control block 10. As above mentioned, the block 10 comprises the detection circuit or module 11, the locking circuit or module 12 and the synchronization circuit or module 13.

The circuit 11 comprises a master/slave designation circuit which is adapted to measure the duration of the switching period of both stages in the initial phase when it is still not known which the master stage is. The circuit 11 receives the signals G1, G2 adapted to drive the gates of the transistors M1 and M2 and measures the distance in time between two consecutive rising/falling edges of each gate drive signal, so as to be able to identify which the slower is; it receives the output signal Z1 and Z2 of the blocks ZCD1 and ZCD2 to start the designation process when both stages are definitely working self-synchronized. The circuit 11 is not required to measure the actual duration of each switching cycle but identifies the longer one.

The circuit 11 also receives the output signal S of the starter block 7 of FIG. 3 and a Time-out signal and outputs two signals: Master_Ok, which tells the other blocks that the master/slave designation has been done, and Master_Id, which carries the information that identifies which the master stage is.

The signal S is optionally used to reset the master/slave designation process in case of missing line cycles in the meantime. In case of missing cycles, switching stops for some time and is restarted by the internal starter. Depending on the actual implementation, this might mislead the designation circuits. To prevent this, it is wise to envisage the ability to reset the designation process every time one stage starts switching driven by the starter and restart it after both stages are working self-synchronized via the Z1 and Z2 signals.

The Time-out signal is used in case the two stages operate at frequencies so close to one another that the master/slave designation circuit cannot distinguish which the slower is within a given time frame (e.g., after 1000 cycles). In this case, almost purely theoretical, it is practically irrelevant which stage is designated as the master because they are identical to all intents and purposes, so a pre-defined designation may be done.

Once the master/slave designation is done, which is indicated by the state changing of the signal Master_Ok, which is a logic signal, the circuit 11 is disabled in some embodiments. Optionally, the circuit 11 can be periodically reactivated to check for a change of roles due to a parameter drift. The circuits 12 and 13 are now enabled to operate.

The circuit 12 receives the gate drive signals G1, G2 and the signal S, in addition to the signals Master_Ok and Master_Id, as input signals. Its function is to measure the duration of the master stage's switching period and release a signal HP_Det when the duration of the current switching period equals half the duration of the previous cycle. This is done again by measuring the distance in time between two consecutive rising/falling edges of the master stage's gate drive signal. This measurement can be done by the same circuit 11 that was active during the master/slave designation operation, in which case the circuits 11 and 12 may actually share some circuits. Then, the distinction between the circuits 11 and 12 is done at block diagram level just to clarify the sequencing of the various functions, but this might not be clearly defined at circuit level.

The signal Master_Ok enables the circuit 12 to release the HP_Det signal while the signal Master_Id determines which stage the circuit 12 is to measure. The signal S resets the circuit 12 when (with the master/slave roles already designated) the master stage restarts after any event that has temporarily stopped converter's operation (e.g., power line missing cycles, output overvoltage, burst-mode operation at light load, etc.), so that the slave circuit is restarted after the first master stage cycle has taken place (and has been measured).

The circuit 12 can have an optional output Synch which is used to activate the circuit 13 when, for example, the actual implementation of the block at circuit level, it cannot be enabled directly by the signal Master_Ok or if the circuit 13 has to be activated in a particular moment in time that is different from that when the master/slave designation occurs.

The circuit 13 is adapted to synchronize the master and slaves stages; the circuit 13 delivers the set signals S1, S2 to the SR flip-flops FF1 and FF2 respectively. In one possible operating option, one of the signal S1 or S2 will be equal to respective signals Z1 and Z2, which is determined by the signal Master_Id, while the other signal S1 or S2 will result from processing the signal HP_Det, optionally combined with the other signal Z1 or Z2.

In another possible operating option, for example, S1 will result from processing the signal Z1 in combination with the optional signal Max_freq (externally programmable via pin jj) and S2 will result from processing the signal HP_Det, optionally combined with Z2, or S2 will result from processing the signal Z1 in combination with the optional signal Max_freq (externally programmable via pin jj) and S1 will result from processing the signal HP_Det, optionally combined with Z2; S1 and S2 are selected by Master_Id. The optional inputs to the circuit 13, that is the signals Synch, G1 and G2 can be used to activate the circuit 13 if the signal Master_Ok cannot or if it is necessary or desired to do so in a specific moment in time different from that when the master/slave designation occurs, or when it is desired to activate the circuit while the gate drive signals are in a specific state (e.g., when both the transistors M1 and M2 are OFF) or in a combination of these conditions.

Figure 5:
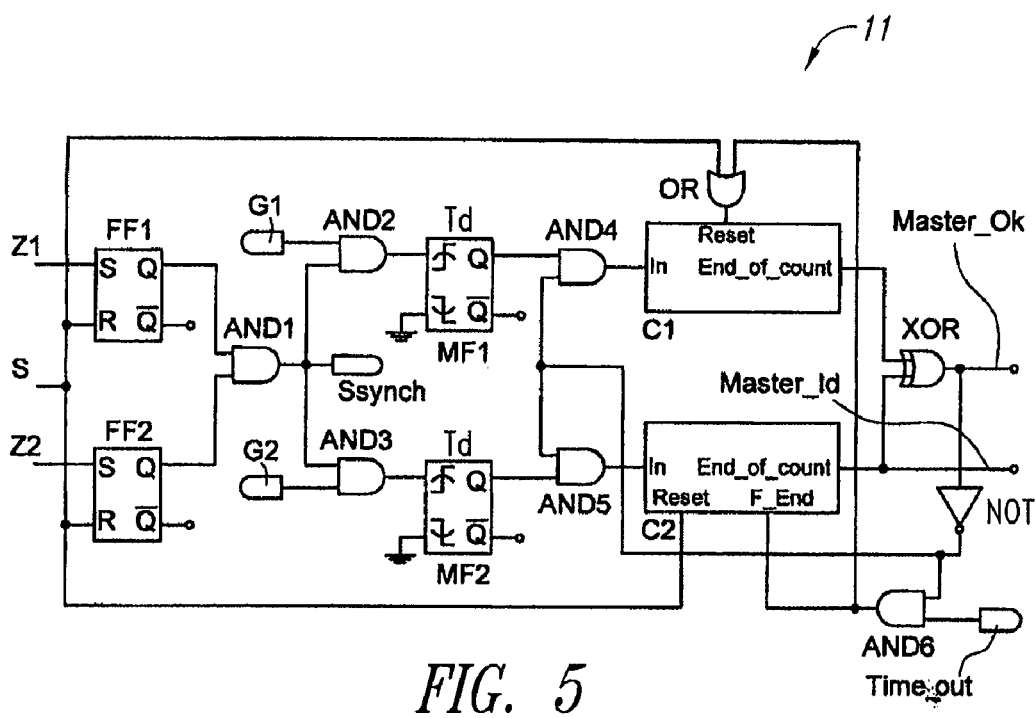
FIG. 5 shows in more detail an embodiment of a detection module 11 suitable for use, for example, in the control block 10 shown in FIG. 4.
Figure 6:
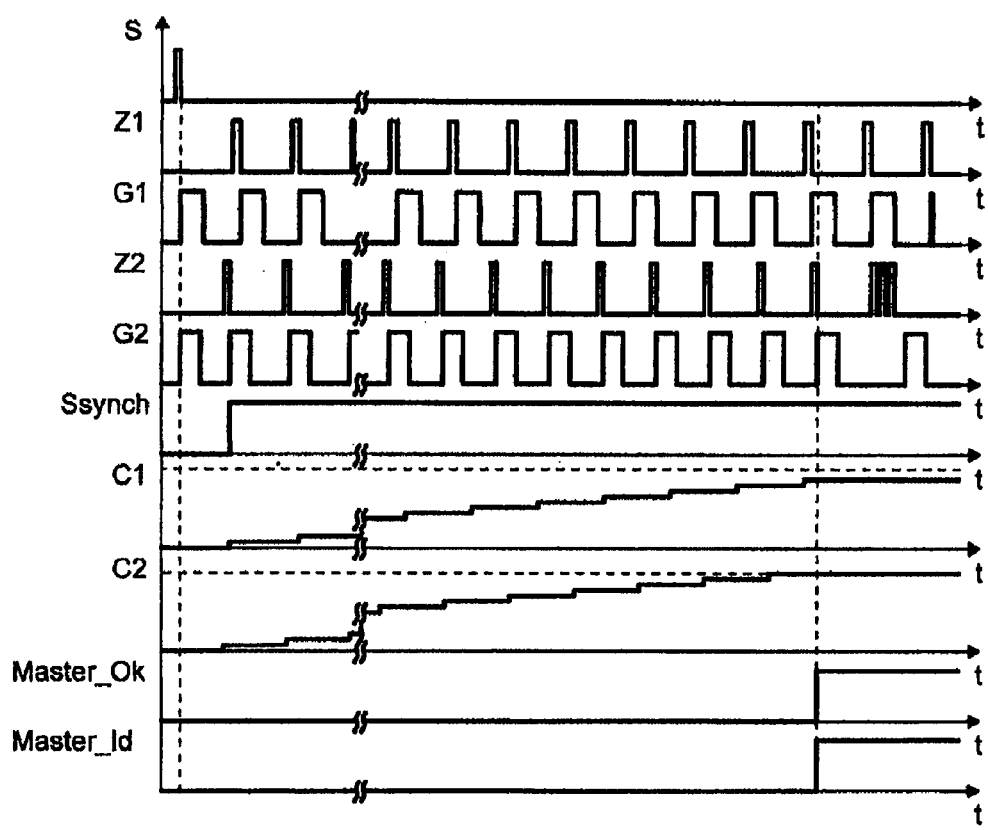
FIG. 6 shows an example time diagram of the signals of the embodiment in FIG. 5.

In FIG. 5 a possible implementation of the circuit 11 is shown and in FIG. 6 a timing diagram of the behavior of the signals in the circuit of FIG. 5 is shown.

The signal Z1 and Z2 are pulses coming from the demagnetization sensing circuits ZCD1 and ZCD2 which set the edge-triggered SR flip-flops FF1 and FF2. These flip-flops are reset by the starter signal S. Then, at start-up, when switching cycles are initiated by the signal S, the outputs of both FF1 and FF2 will be low and the output Ssynch of the AND gate AND1 will be low as well, thus blocking the signals G1 and G2, which are high when the transistors M1 and M2 are ON and low when said transistors are OFF. The signal Ssynch will be high and the Master/slave designation process of the circuit 11 can start only when both the flip-flops FF1 and FF2 are set, that is, both stages are able to be self-synchronized. When a switching cycle is initiated by the signal S, the signals G1 and G2 come immediately after because of the propagation delay of the internal circuits. As long as Ssynch is low both converter stages must work driven by the starter to make sure that when the Master/slave designation process begins the switching periods of the two converter stages will start at the same time.

Once the signal Ssynch is high, the signals G1 and G2 can go through the AND gates AND2, AND3 and their positive-going edges trigger the mono-flops MF1 and MF2, which release pulses of duration Td.

As long as the master/slave designation has not been done (then the signal Master_Ok is low) the gates AND4, AND5, which receive the signal Master_Ok through the gate NOT, let the pulses of MF1 and MF2 reach the two divide-by-n counters C1, C2. The pulses coming from MF1 increase C1 by one; those from MF2 increase C2 by one. The counters are initially set at zero by the signal S and their outputs are low; the output of the Exclusive-OR gate XOR is low. As the switching cycles follow each other, one of the signals G1 or G2 (that corresponding to the boost stage with a smaller inductance value) will tend to anticipate with respect to the other because any difference in the switching period, as small as it can be, will accumulate cycle after cycle. Therefore, the corresponding counter will count the n-th cycle before the other does and the corresponding End_of_count flag will be asserted high.

The signal Master_Ok, which is asserted high whichever End_of_count flag goes high, reports that the master/slave designation has been done and, fed back to the gates AND4, AND5, stops the counters thus freezing their status. The signal Master_Id becomes significant as the signal Master_Ok is high, thus it can be simply either of the two End_of_count flags. In this specific case, the signal Master_Id high means that stage 2 is faster than stage 1, then stage 1 will be the master and stage 2 the slave; the signal Master_Id low means that stage 1 is faster than stage 2, then stage 2 will be the master and stage 1 the slave.

If the master/slave designation has not been done yet (then Master_Ok is low) and the signal Time-out is asserted high (e.g., after a pre-determined number of switching cycles) then the End_of_count flag of the counter C2 will be forced high through its F_End input and the counter C1 will be reset, so as to designate stage 1 as the master stage and stage 2 as the slave one. Actually, it can theoretically happen that the two stages 1 and 2 are so close to one another that, after n switching cycles, the counters CJ (j=1, 2) reach the end of count at the same time or, better, within so small a time difference that it cannot be distinguished by the logic circuitry, so that the End_of_count flags are both asserted high and the output of the XOR gate remains low. Since with modern low-cost silicon technologies the internal propagation delay of elementary gates are lower than 1 ns, it is possible to estimate that the total propagation delay of the "counter freezing" loop including the counters themselves, the XOR gate, the NOT gate and the AND gates AND4, AND5 is in the range of 10 ns. Even with not too big values for n, (e.g., 8 or 16, it is convenient to use powers of 2) the master/slave designation circuit might fail to detect the slower circuit when the time difference in their switching period is just few ns. From the practical point of view, in this case the two stages are equal to one another and it is irrelevant which is designated as the master and which as the slave stage; hence, pre-defined master/slave roles makes sense in such circumstances.

Figure 7:
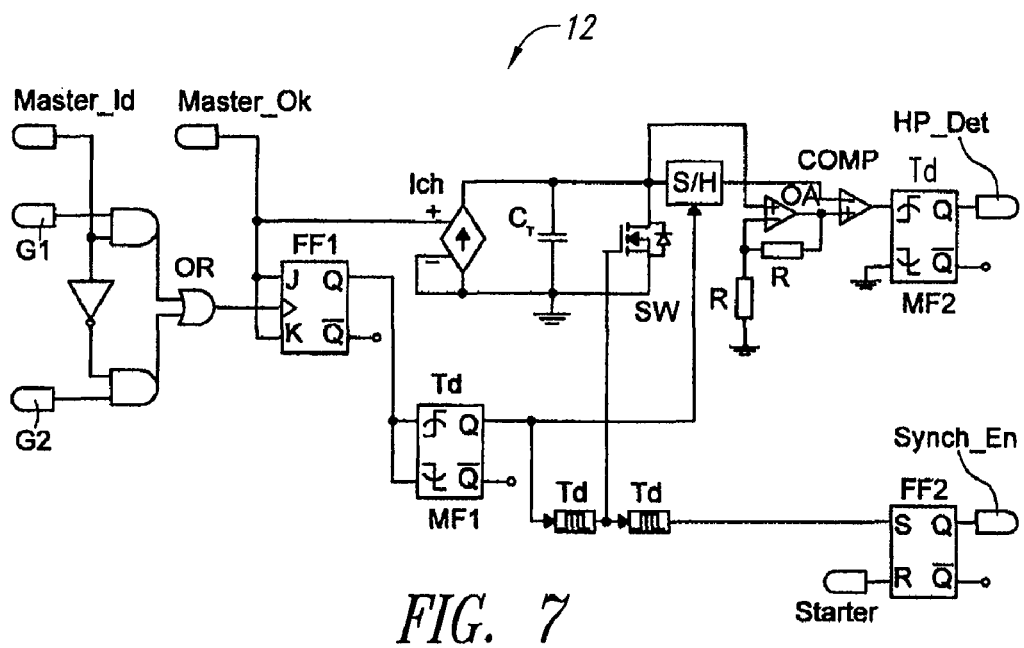
FIG. 7 shows in more detail an embodiment of a locking module 12 suitable for use, for example, in the control block 10 shown in FIG. 4.
Figure 8:
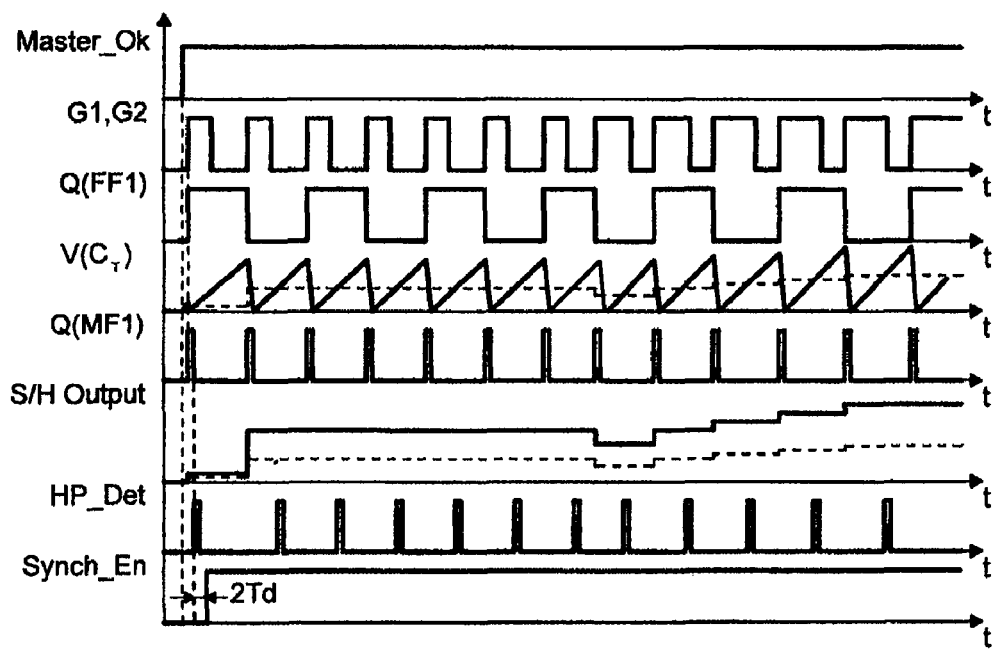
FIG. 8 shows an example time diagram of the signals of the embodiment in FIG. 7.

FIG. 7 shows a possible implementation of the circuit 12. In FIG. 8 a timing diagram shows the behavior of the signals in the circuit 12.

As the signal Master_Ok goes high the JK flip flop FF1 works as a T flip-flop, that is, its output Q ($\overline{Q}$ is 180° out-of-phase) toggles between low and high states every time there is a positive-going edge applied to its input. This input is the output of the OR gate, which conveys the signal G1 if the signal Master_Id is high (the stage 1 is the master) or the signal G2 if the signal Master_Id is low (the stage 2 is the master). The output of the flip-flop FF1 will be a square wave having a frequency equal to half the switching frequency of the Master stage. The output Q of the flip-flop FF1 is initially low and, then, $\overline{Q}$ is high.

The signal Master_Ok also enables the current generator Ich that charges the timing capacitor CT, provided the switch Sw is open. The switch Sw is normally open, except for a short time Td determined by the edge-triggered mono-flop MF1 following the transitions of the output Q of the flip-flop FF1. The voltage across the capacitor CT is then a linear ramp that is reset at zero every time that the switch Sw is turned on, that is, every time the output Q of the flip-flop FF1 changes state, that is, every time that the signal G1 (if the stage 1 is the master stage) or the signal G2 (if the stage 2 is the master stage) goes high with a small time delay Td.

The sawtooth signal across the capacitor CT is fed to a Sample-and-Hold circuit S/H that stores the peak value at every change of state of the output Q of the flip-flop FF1, just before the ramp is reset by the switch Sw turned on. The sampled value is then proportional to the distance in time between two consecutive positive-going edges of the master signal G1 or G2 and, therefore, provides a measurement of the switching period duration for the master stage. The value stored in the circuit S/H is compared with the current value across the capacitor CT multiplied by two by the non-inverting amplifier composed of an operational amplifier OA and the two resistors R equal to one another. When the two inputs of the comparator COMP are equal to one another, which means that the instantaneous value across the capacitor CT equals half the peak value of the sawtooth signal stored in the previous cycle, the output of the comparator COMP goes high and the positive-going, edge-triggered mono-flop MF2 releases a short pulse HP_Det that signals that half the duration of the previous switching cycle has been reached.

The first cycle, the value stored by the circuit S/H is zero and then the pulse HP_Det is released at the beginning of the switching cycle. To prevent an improper synchronization of the slave, the signal Synch_En, the output signal of the edge-triggered SR flip-flop FF2, goes high after the end of the first HP_Det pulse thanks to the additional Td delay, so that the downstream circuit can ignore the first spurious pulse.

Figure 9:
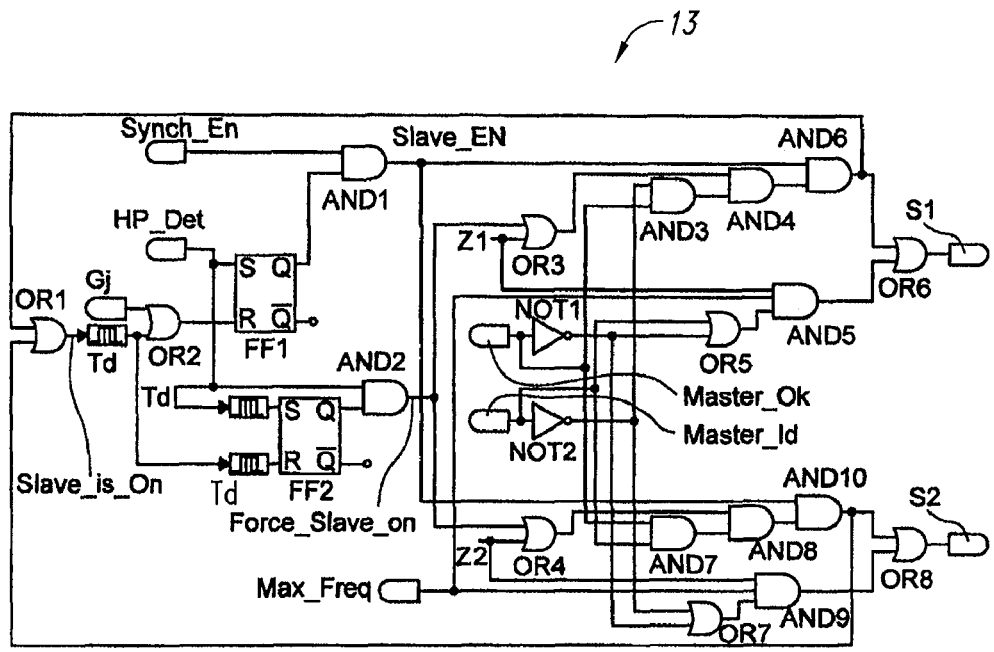
FIG. 9 shows in more detail an embodiment of synchronization module 13 suitable for use, for example, in the control block 10 in FIG. 4.
Figure 10:
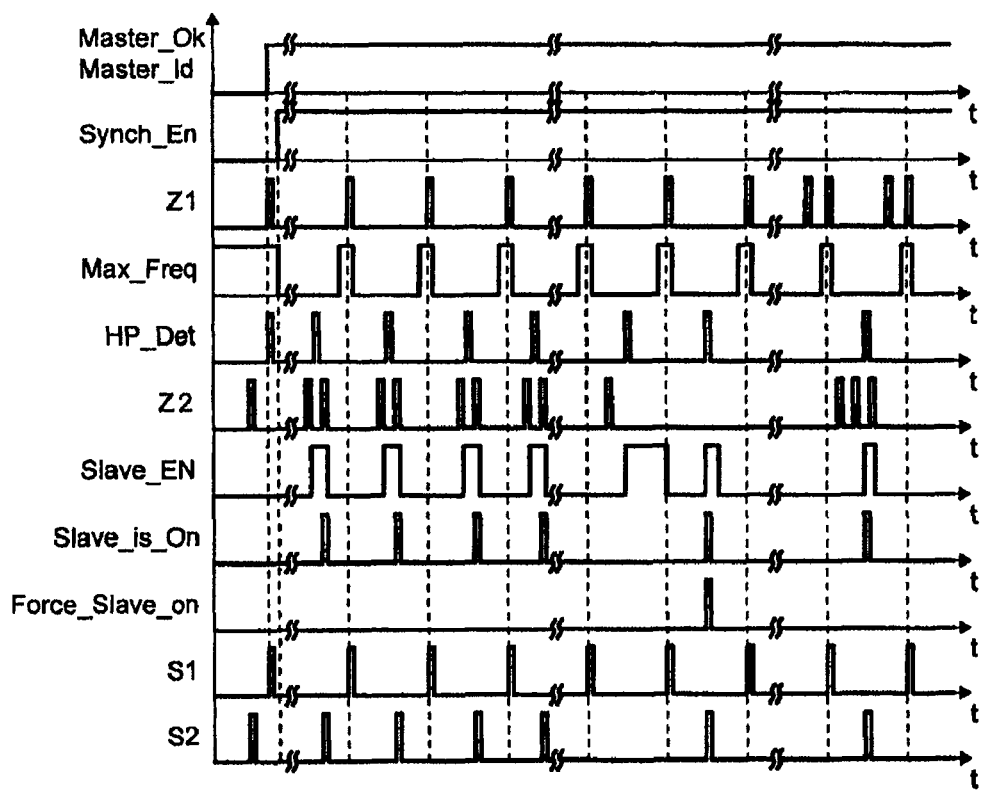
FIG. 10 shows a time diagram of the signals of the embodiment in FIG. 9.

FIG. 9 shows a possible implementation of the circuit 13. The circuit includes all of the optional functions described in the generalized methodology, that is, valley switching operation for the slave stage and maximum frequency limitation of the master stage (and then of the slave stage too). In FIG. 10 a timing diagram shows the behavior of the signals in the circuit 13.

The master stage is turned on by the demagnetization signal Z1 or Z2; in case wherein a maximum frequency limitation is desired, then the first pulse Z1 or Z2 after the signal Max_Freq has given the consensus will be considered. The signal Max_Freq will be a logic level that is high before designating the Master and Slave roles; once these are defined, it will be asserted low at the beginning of each cycle of the master stage and remain low as long as the minimum switching period has not elapsed (Maximum frequency limitation); if no limitation is desired this will be kept high at all times. The minimum switching period duration will be determined by a system similar to that described in the circuit 12.

As to the slave stage, it will be turned on by either the HP_Det signal (to achieve exactly 180° phase-shift) or the first pulse of the signal Z1 or Z2 following the HP_Det signal (to achieve valley switching). Additionally, a restart is provided for the slave stage in case the relevant signal Z1 or Z2 after HP_Det is lost (this function may be done by the internal Starter for the master stage).

When the signal Master_Ok is low, i.e., the Master/Slave designation has not been done yet, the outputs of AND3, AND4 and AND6 on one side, and the outputs of AND7, AND8 and AND10 on the other side are low, then the signal Slave_EN is ineffective and the mechanism that synchronizes the slave stage is disabled. On the other hand, due to the gate NOT1, the outputs of OR5 and OR7 are high; then, being Max_Freq high too, AND5 will let the pulses of the signal Z1 pass on to OR6 and then to S1, hence turning on the MOSFET of the stage 1 and AND6 will let the pulses of the signal Z2 reach S2, hence turning on the MOSFET of the stage 2. As a result, in this phase both stages work as the master stage.

Once the Master/Slave designation is done, the signal Master_Ok goes high and the outputs of OR5, OR7 will depend on the value of Master_Id. Since the circuit block composed of the logic gates AND3 to AND6, OR5 and OR6, which handles the signal Z1, is exactly identical to that composed of AND7 to AND10, OR7 and OR8, which handles the signal Z2, so as to interchange their operation according to the value of the signal Master_Id, only one value of the signal Master_Id will be considered, the operation can be applied by extension to the other.

Let us assume then that signal Master_Id is high (stage 1 is the master). The gates AND3, AND4 and AND6 are blocked through NOT2 and only AND5 works because the output of OR5 is high. In this case the pulses of the signal Z1, if the signal Max_Freq is high, will be transmitted to the gate OR6 and then to S1, hence turning on the transistor M1 of the stage 1.

The output of OR7 is low, and then Z2's way through AND9 is now blocked. The output of AND7 is high, and then AND8 is enabled and the way through AND10 will be open as the signal Slave_EN (output of AND1) is high. The signal Slave_EN will be asserted high by the pulse of the signal HP_Det setting the edge-triggered SR flip-flop FF1, provided that the signal Synch_En is high (this will reject the first HP_Det pulse after Master/Slave designation that is not correctly released as previously mentioned). In this way the first pulse of the signal Z2 following the HP_Det signal will be transmitted to the gate OR8 and then to S2, hence turning on the MOSFET of the stage 2. At the same time the pulse of the signal Z2 coming out of the gate AND10, after transiting through OR1 (Slave_is_On), a delay cell and OR2 resets the flip-flop FF1. The signal Slave_EN is then re-asserted low and is ready for the next cycle. The signal Slave_is_On resets also the edge-triggered SR flip-flop FF2.

The flip-flop FF2 and the AND gate AND2 are the mechanism that restarts the slave stage (stage 2 in the present case) in case there is no pulse of the signal Z2 after the signal HP_Det. The signal HP_Det goes to AND2 and, if the output Q of the flip-flop FF2 is high, it becomes a pulse Force_Slave_on that is passed on to AND10 through OR4 and AND8. Since the same pulse HP_Det has asserted the signal Slave_EN high, it will also pass through AND10 to OR8 and to S2, hence turning on the MOSFET of the stage 2 in case it was not yet on. Similarly, this will in turn re-assert the signal Slave_EN low and reset the flip-flop FF2, so as to be ready for the next cycle.

The flip-flop FF2 is set by the signal HP_Det after a delay Td longer than the duration of the pulse of the signal HP_Det: thus, the signal Force_Slave_on can be high only if the flip-flop FF2 has not been reset, which happens if in the previous cycle there was no positive-going edge of the signal Slave_is_On (i.e., the output of AND10 was not asserted high), that is, there was no pulse of the signal Z2 and the slave stage was not turned on.

In the end, in case the slave stage stops, it will restart after skipping just one cycle. Note that in this case also the flip-flop FF1 would not be reset; the signal G1 will do this to ensure that the output of AND10 and, then, the signal S2 cannot go high before the signal HP_Det is released.

Figure 11:
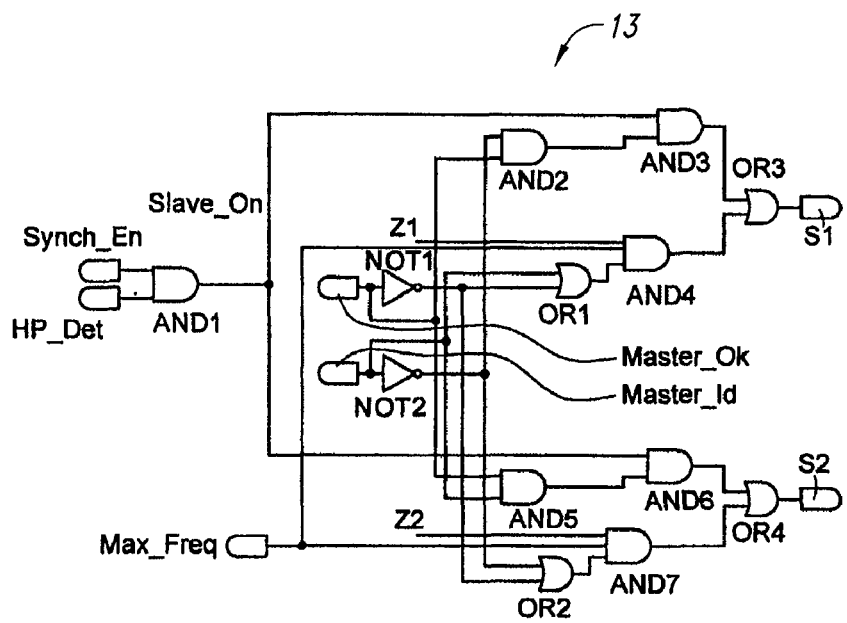
FIG. 11 shows in more detail another embodiment of a synchronization module 13 suitable for use, for example, in the control block 10 in FIG. 4.

Note also that, if a 180° phase-shift between the two stages is desired and not valley switching for the slave stage, the circuit might be considerably simplified as shown in FIG. 11, that the flip-flops FF1 and FF2, the gates OR1 and OR2 and the block that sets the delay Td are not necessary.

The operation of this circuit with the signal Master_Ok low is unchanged as compared to that of the circuit in FIG. 9. Also in this case the circuit block composed of the logic gates AND2 to AND4 and OR3, which handles the signal Z1, is exactly identical to that composed of AND5 to AND7 and OR4, which handles the signal Z2, so as to interchange their operation according to the value of the signal Master_Id; therefore only one value of the signal Master_Id will be considered, the operation can be applied by extension to the other.

When the signal Master_Ok is high, assuming also that the signal Master_Id is high (stage 1 is the master), the gates AND2 and AND3 are blocked through NOT2 and only AND4 works because the output of OR1 is high. In this case the pulses of the signal Z1, if the signal Max_Freq is high, will be transmitted to the gate OR3 and then to S1, hence turning on the transistor M1 of the stage 1.

The output of OR2 is low, and then the signal Z2 through AND7 is now blocked. The output of AND5 is high, and then the pulses of the signal HP_Det, except the first one that will be rejected by the signal Synch_En still low, will be routed to OR4 through AND6 and then to the signal S2, hence turning on the transistor M2 of the stage 2.

Figure 12:
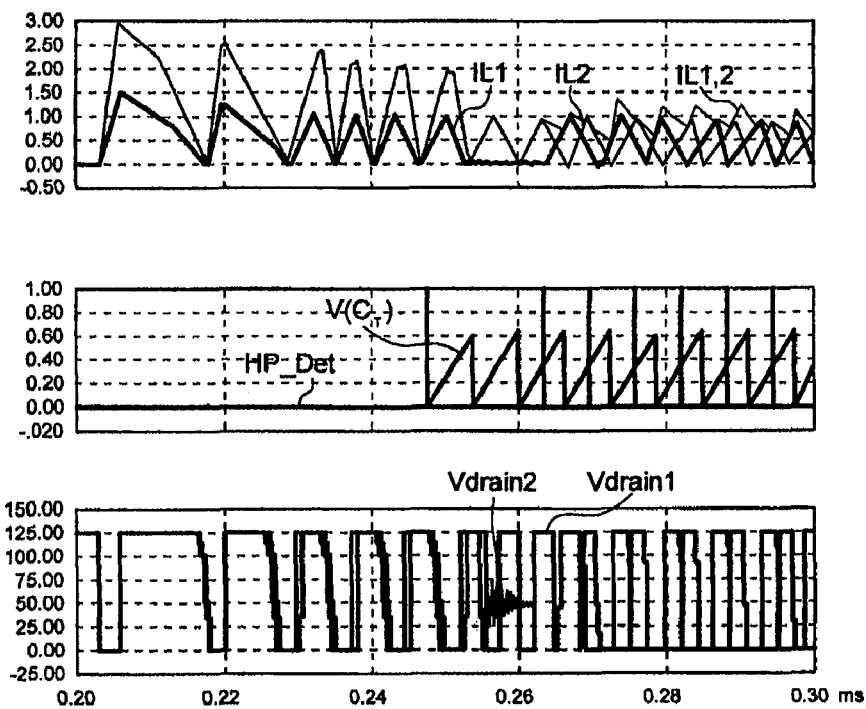
FIG. 12 shows a simulation of the operation of the controller show in FIG. 3.

The results of a simulation are shown in FIG. 12, where it is possible to see the master/slave designation phase, during which the two stages are both working self-synchronized to the demagnetization of their respective inductors, and the synchronized phase where, once the designation is made, the slave stage is locked to the master stage so as to work in valley switching too.

The simulated system was a 400 W interleaved PFC pre-regulator with wide-range mains input (88 to 264 Vac), 400 Vdc regulated output. Stage 1 has a boost inductor of 175 µH and stage 2 a boost inductor of 170 µH; the former will then be the master stage.

The first timing diagram shows the individual boost inductor currents IL1 and IL2 and the combined current IL12 that will be visible at the input of the PFC pre-regulator; the second timing diagram shows the voltage V(CT) across the timing capacitor CT, the signal HP_Det that marks half the period of the master stage in the previous cycle; the third timing diagram shows the drain voltage Vdrain1 and Vdrain2 of the transistor M1 and M2.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller comprising:
    an interface to couple the controller to a plurality of interleaved converters;
    a designating module configured to selectively designate one of the plurality of converters as a master converter;
    a locking module configured to generate signals to control undesignated converters in the plurality of converters; and
    a synchronizing module configured to synchronize the converters in the plurality of converters.

2. The controller of claim 1 wherein the designating module is configured to detect a power converter in the plurality of power converters having a lowest operating frequency and to designate the detected converter as the master converter.

3. The controller of claim 1 wherein the locking module is configured to set delay periods for unselected converters in the plurality of converters.

4. The controller of claim 3 wherein the designating module is configured to measure a switching cycle of the master converter.

5. The controller of claim 4 wherein the delay periods are portions of the measured switching cycle of the master converter and commence after a beginning of a successive switching cycle of the master converter.

6. The controller of claim 5 wherein the plurality of converters comprises a number of converters and the locking module is configured to set respective delay periods for the non-designated converters that are successive multiples of the measured switching cycle divided by the number of converters in the plurality of converters.

7. The controller of claim 1 wherein the locking module is configured to set delay periods after designation of the master converter, the delay periods have a threshold duration and the delays commence after a beginning of a successive switching cycle of the master converter.

8. The controller of claim 1, further comprising:
a blocking module configured to selectively delay a switching cycle of a non-designated converter, said blocking module being configured to compare measured switching cycle to a threshold and to selectively delay switching of the non-designated converter based on the comparison.

9. The controller of claim 1, further comprising:
a resetting module configured to generate a reset signal in response to a missing line cycle.

10. The controller of claim 1 wherein the designating module is configured to respond to a time-out signal by selecting a default master converter.

11. The controller of claim 1 wherein the controller is configured to generate control signals to operate the plurality of converters in a valley-switching mode.

12. The controller of claim 1 wherein:
the plurality of interleaved converters each comprise a power transistor and an inductor, the operating frequency of the converter depending on the demagnetisation of the inductance;
the designating module is configured to receive drive signals for the transistors and signals indicating zero-cross currents in the inductors, to designate the master converter after the plurality of converters are self-synchronized and to output a designation signal to the locking module; and
the locking module is configured to receive the designation signal and to output an operating cycle time delay signal to the means for synchronizing.

13. The controller of claim 1 wherein the controller is configured to operate in a transition mode.

14. A system, comprising:
a plurality of interleaved converters; and
a controller having:
an interface to couple the controller to the plurality of interleaved converters;
a designating module configured to selectively designate one of the plurality of converters as a master converter;
a locking module configured to generate signals to control undesignated converters in the plurality of converters; and
a synchronizing module configured to synchronize the converters in the plurality of converters.

15. The system of claim 14, further comprising a power factor corrector, wherein an output of the plurality of converters is coupled to an input of the power factor corrector.

16. A method of controlling a system having a plurality of interleaved power converters, the method comprising:
dynamically selecting one of the plurality of power converters as a master converter;
setting a delay time for an unselected converter in the plurality of converters; and
synchronizing subsequent cycles of the plurality of power converters based on the selection of the master converter.

17. The method of claim 16 wherein the selecting one of the plurality of power converters comprises determining which power converter in the plurality of power converters has a slowest operating frequency and selecting the power converter with the slowest operating frequency as the master converter.

18. The method of claim 17, further comprising measuring a duration of a switching cycle of the master converter.

19. The method of claim 18 wherein the delay time for a current cycle of the non-selected converter is based on the measured duration of a prior switching cycle of the master converter.

20. The method of claim 16 wherein the plurality of converters comprises a number of converters and respective delay times for non-selected converters are shifted from each other by a period of time equal to the measured duration of the prior switching cycle of the master converter divided by the number of converters in the plurality of converters.

21. The method of claim 16 wherein each of the plurality of converters comprises an inductance and has an operating frequency based on a demagnetization of the respective inductance.

22. The method of claim 16 wherein a delay time for a non-selected power converter is a threshold period of time after a beginning of a cycle of the master converter.

23. The method of claim 22, further comprising:
blocking a switching of the non-selected power converter when a measured cycle of the master converter is longer than the threshold period of time.

24. The method of claim 16 wherein the delay time for a non-selected power converter is a threshold period of time after an end of a cycle of the master converter.

25. The method of claim 16 further comprising generating a time-out signal when the master converter is not selected within a threshold period of time.

* * * * *